United States Patent

[11] 3,559,529

| [72] | Inventor | Thomas D. Vertin<br>37540 Lake Shore Road, Mount Clements, Mich. 48043 |
|---|---|---|
| [21] | Appl. No. | 774,881 |
| [22] | Filed | Nov. 12, 1968 |
| [45] | Patented | Feb. 2, 1971 |

[54] TWO-AXIS MACHINING HEAD FOR USE ON A THREE-AXIS MACHINE TO PROVIDE A CUTTING TOOL WITH A FIVE-AXIS MOVEMENT
5 Claims, 17 Drawing Figs.

[52] U.S. Cl........................................................ 90/13, 90/17
[51] Int. Cl....................................................... B23c 1/16
[50] Field of Search........................................... 90/13cl, 13.1, 13.2, 17X, 13.8

[56] References Cited
UNITED STATES PATENTS

| 2,445,039 | 7/1948 | Rusnok ........................ | 90/17-X |
| 2,572,756 | 10/1951 | Plimmer et al................ | 90/13-X |
| 2,863,361 | 12/1958 | Daugherty.................... | 90/13 |
| 2,868,086 | 1/1959 | Gunderson................... | 90/13 |

*Primary Examiner*—Gil Weidenfeld
*Attorney*—Donnelly, Mentag and Harrington

ABSTRACT: A two-axis machining head with tangent displacement and angular displacement for use on a three-axis machine to provide a five-axis controlled machine with seven movements of a cutting tool comprising, longitudinal, transverse, vertical, tangent displacement, angular displacement, spindle side adjustment, and spindle vertical adjustment movements.

PATENTED FEB 2 1971

X — LONGITUDINAL
Y — TRANSVERSE
Z — VERTICAL
$T_D$ — TANGENT DISPLACEMENT
$A_D$ — ANGULAR DISPLACEMENT
$S_S$ — SPINDLE SIDE ADJUST.
$S_V$ — SPINDLE VERT. ADJUST.

FIG. 2

TANGENCY NORMAL TO SURFACE

CENTER LINE OF CUTTER PATH

FIG. 3

$T_D$ & $A_D$ AXIS INTERSECTION PT.

INVENTOR
THOMAS D. VERTIN
BY
Donnelly, Mentag & Harrington
ATTORNEYS

"ANGLE CONTROL NORMAL TO SURFACE"
±30° DEGREES = ± 5.400 INCHES 3,559,529

1

TWO-AXIS MACHINING HEAD FOR USE ON A THREE-AXIS MACHINE TO PROVIDE A CUTTING TOOL WITH A FIVE-AXIS MOVEMENT

SUMMARY OF THE INVENTION

This invention relates generally to machining heads for machining production tools or aids, and more particularly, to a two-axis machining head with angle and tangency displacement for use on a three-axis machine having controlled longitudinal, transverse and vertical movements so as to convert the machine into a five-axis controlled machine with seven movements.

Heretofore, it has been not been possible to machine a three-dimensional variant surface to the final size. The prior art machines could not follow the actual part contour. For example, in the aircraft industry, in the construction of aircraft, it is necessary to provide annular reinforcement members having contoured peripheries which mate with the three-dimensionally variant skin of an aircraft. Before the present invention it was necessary to carry out a plurality of cutting or machining operations to provide the necessary forming blocks or tools to form said contoured peripheries. The prior art machines functioned by making a series of cuts on a part form block, but the surface so cut on the form block was not the desired final contour and further operations were necessary.

In view of the foregoing, it is an important object of this invention to provide a machining head for a machine which increases the machining capability of the machine and overcomes the aforementioned disadvantages of the prior art machines.

The machining head of the present invention is arranged and constructed to provide a cutting tool with the usual X, Y and Z movements, and in addition thereto, with a tangent displacement movement, an angular displacement movement, a spindle side adjustment movement, and a spindle vertical adjustment movement, whereby the cutting tool is capable of machining a final three-dimensional variant contour or surface on a workpiece. The machining head of the present invention lowers fixture costs because several operations can be done with only one setup. Also, because fewer fixtures of simplified design are needed, the fixtures are less expensive due to the broad operating ability of the machining head.

Advantageously, the machining head of the present invention lowers tool costs for many reasons. A machine provided with a machining head of the present invention can follow the actual part contour and not merely the cutter path. A single program can be used for both machining and checking. The workpiece or part can be inspected while it is still on the machine by replacing the cutting tool with a checking probe, and the probe will remain normal to the surface during a checking operation.

The machining head of the present invention provides reduced lead time advantages when machining variant contours or surfaces because the required setup time is reduced because fewer operations are needed; the number of tools needed to build a workpiece is reduced; few, if any, special cutters are required; fixture building time is reduced because of fewer fixtures being needed; simplified programming reduces inspection time for tooling; engineering changes cost less; and, there are fewer templates to make.

The machining head of the present invention comprises a pivot housing adapted to be slidably mounted on the X axis structure of a three-axis machine for movement along the X axis, an upper or first slide member rotatably mounted on said pivot housing for providing a pivoting movement to a cutting tool about a vertical axis to provide said tool with tangent displacement, a lower or second slide member, means slidably mounting said second slide member on said first slide member for downwardly facing concave arcuate movement to provide said tool with an axial angular displacement relative to said vertical axis, with the front end of the tool disposed downwardly toward said vertical axis, a compound slide means carried by said second slide member, a power driven cutting tool spindle carrying said cutting mounted on said compound slide means, and, means for adjusting said compound slide means to provide said tool spindle and cutting tool with an axial adjustment and a side or lateral adjustment relative to the axis of the tool spindle and tool.

The machine of the present invention includes, a first slide member, means for rotatably mounting said first slide member on one of said three machine members for rotation about a vertical axis to provide a cutting tool with tangent displacement, a second slide member, a cutting tool spindle carried by second slide member and having a cutting tool operatively mounted therein, and, means slidably mounting said second slide member on said first slide member for downwardly facing concave arcuate movement to provide said cutting tool with an axial angular displacement relative to said vertical axis, with the front end of the cutting tool disposed downwardly toward said vertical axis.

Other objects, features and advantages will be apparent from the following detailed description of the invention and the subjoined claims.

IN THE DRAWINGS

FIG. 13 is an enlarged, front elevational view of the spindle and angular displacement slide structure of the machining head of the present invention;

Figure 11:
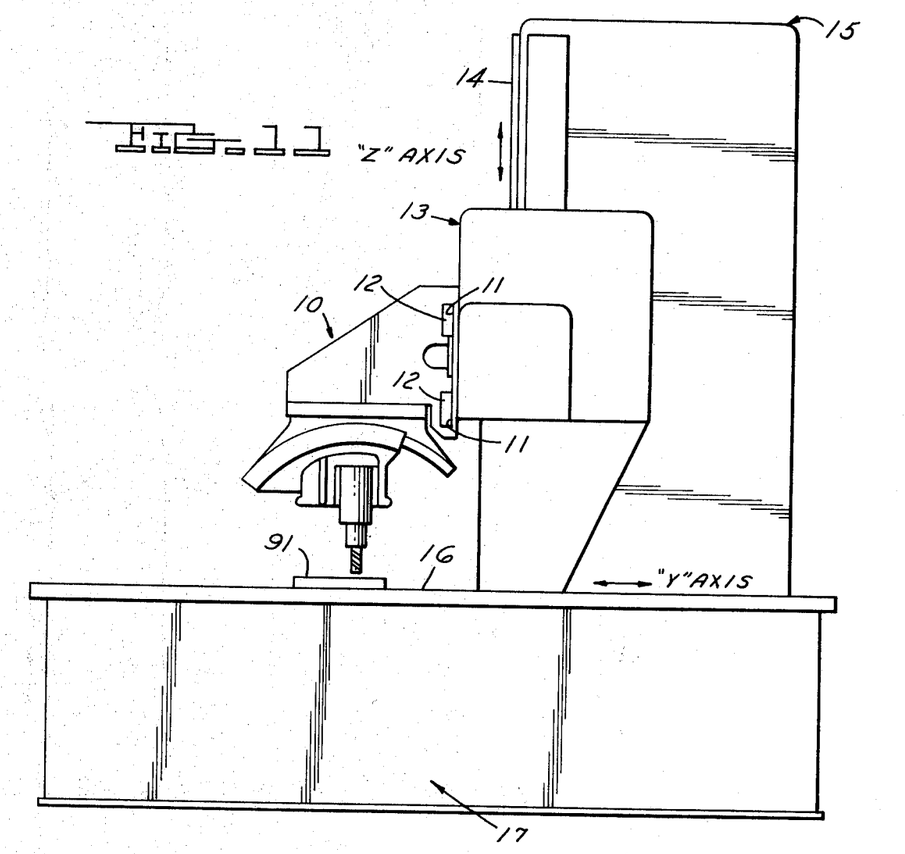
FIG. 11 illustrates a side elevational view of a three-axis machine provided with a machining head of the present invention so as to provide a five-axis controlled machine, with seven cutting tool movements.

Referring now to the drawings, and in particular to FIG. 11, it will be seen that the machining head of the present invention includes a pivot housing, generally indicated by the numeral 10, which is slidably mounted by the slide members 11 on the horizontal ways or X axis arm 12 of a three-axis machine. The machine illustrated in FIG. 11 is merely illustrative of the type machine with which the machining head of the present invention is adapted to be used. As shown in FIG. 11, the machine X axis arm 12 is carried on the slide 13 which is slidably mounted on the vertical ways 14 on the movable head 15. The machine head 15 is adapted to be moved on the horizontal ways 16 on the bed 17 to provide the Y axis movement. The movement of the machine slide 13 provides the Z axis movement.

Figure 15:
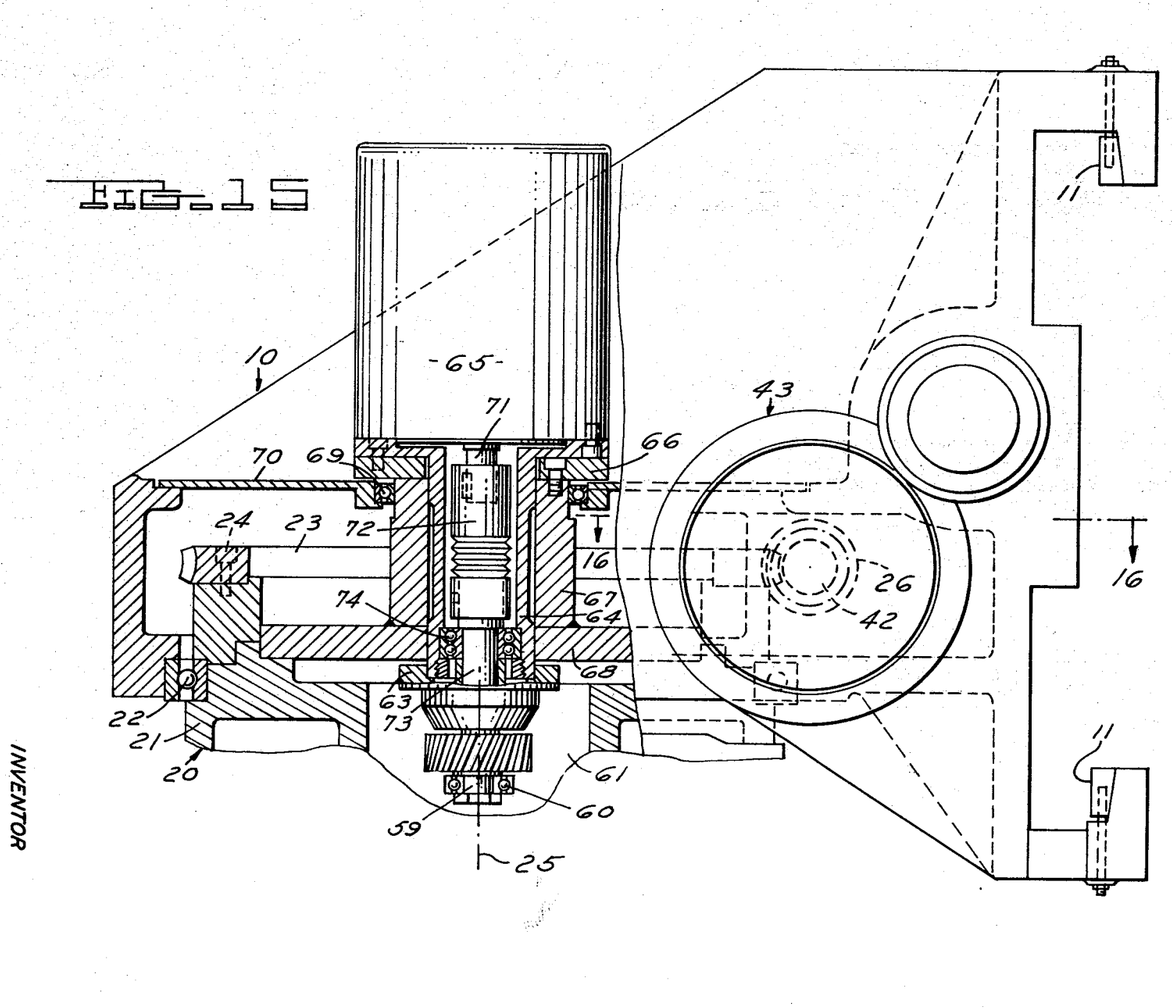
FIG. 15 is a fragmentary, elevational section view of the structure illustrated in FIG. 14, taken along the line 15—15 thereof, and looking in the direction of the arrows.

As best seen in FIG. 13, the machining head further includes an upper or first slide, generally indicated by the numeral 20, which has an annular upper end 21 rotatably mounted by the bearing 22 (FIG. 15) on the pivot housing 10. As shown in FIG. 15, the upper slide 20 has fixed on its upper end, by the screws 24, an annular drive gear 23 which is meshed with and driven by the worm gear 26. It will be seen that the upper slide 20 is thus rotatably mounted about a vertical axis indicated in FIG. 15 by the numeral 25.

Figure 16:
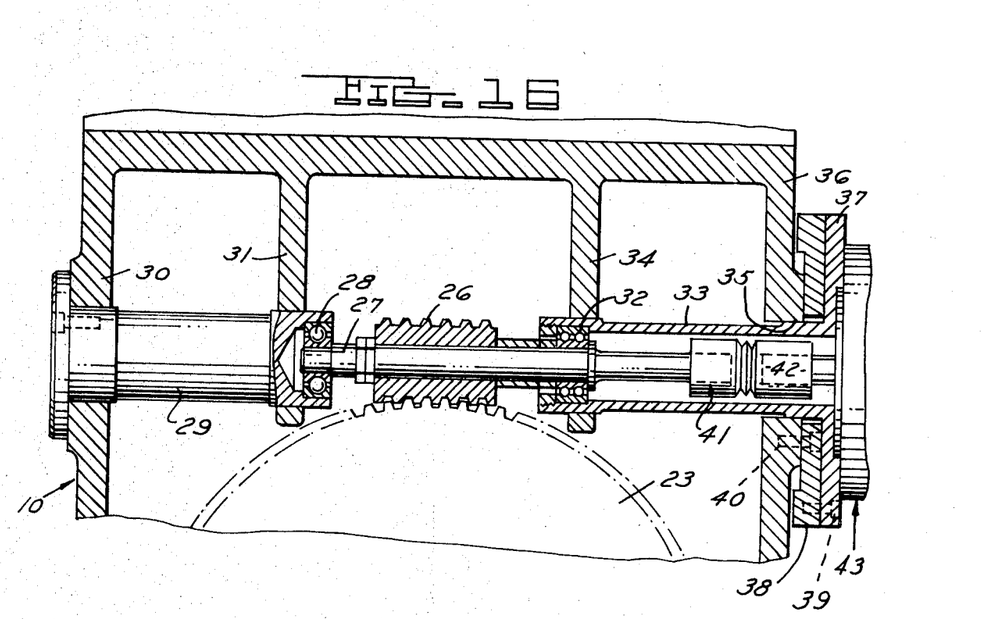
FIG. 16 is a fragmentary, horizontal sectional view of the structure illustrated in FIG. 15, taken along the line 16—16 thereof, and looking in the direction of the arrows; and, FIG. 17 is a horizontal view of the structure illustrated in FIG. 14, taken along the line 17—17 thereof, and looking in the direction of the arrows.

As shown in FIG. 16, the worm gear 26 is fixed on the shaft 27 which has one end journaled in the bearing 28 that is seated in one end of the bearing retainer 29. The bearing retainer 29 is secured in place between the two pivot housing walls 30 and 31 by suitable means. The other end of the shaft 27 is rotatably supported by the bearing 32 which is seated in the inner end of a tubular support shaft 33. One end of the shaft 33 is extended through and supported by the housing wall 34. The other end of the shaft 33 extends through the opening 35 in the housing wall 36 and carries the motor support plate 37. The motor support plate 37 is secured by the bolts 39 to the mounting plate 38. The plate 38 is secured to the housing wall 36 by the screws 40. The outer end of the shaft 27 is operatively connected by a suitable coupling member 41 to the output shaft 42 of the drive motor 43. The drive motor 43 may be any suitable electric or hydraulic motor, and is also called the tangent displacement drive motor.

Figure 14:
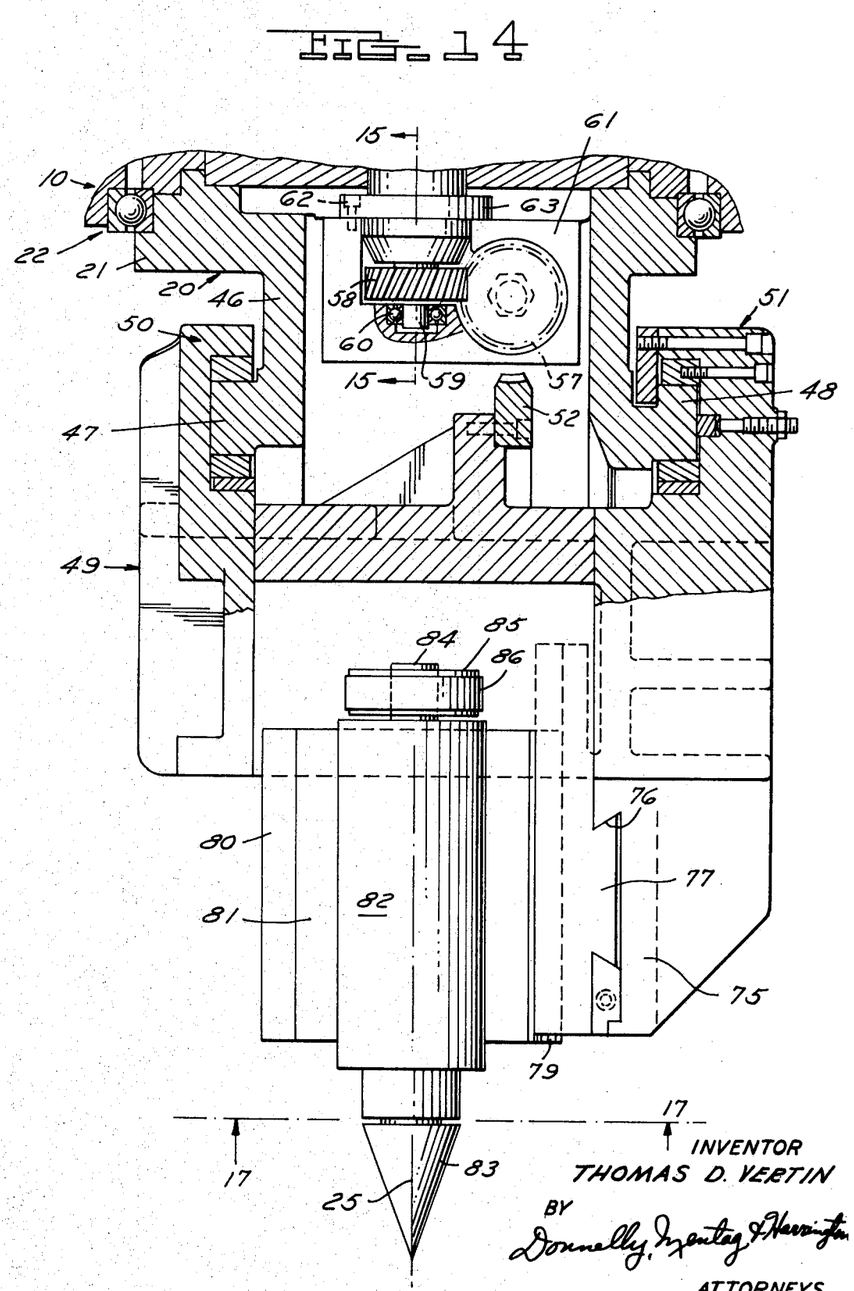
FIG. 14 is an enlarged, fragmentary, elevational section view of the structure illustrated in FIG. 13, taken along the line 14—14 thereof, and looking in the direction of the arrows.

As shown in FIG. 14, the upper slide 20 is provided on the lower end thereof with a reduced neck portion 46 which is provided on its sides with a pair of spaced apart slideways 47 and 48. The slideways 47 and 48 are arcuately shaped, and are disposed with the concave side thereof facing downwardly, as best seen in FIG. 13. As best seen in FIGS. 13 and 14, the machining head further includes a lower or second slide 49 which has a pair of spaced apart slide members 50 and 51 for slidable engagement on the slideways 47 and 48, respectively, on the upper slide 20.

As shown in FIG. 14, the lower slide 49 has an arcuate rack gear 52 secured to a transverse portion and disposed so as to extend upwardly into the hollow upper slide 20. As shown in FIG. 13, the gear rack 52 is meshably engaged with and driven by a worm gear 53 which is carried on the shaft 54. One end of the shaft 54 is journaled on the block 55 which is secured to the upper slide 20. The other end of the shaft 54 is journaled in the block 56 which is also secured to the upper slide 20. As shown in FIGS. 13 and 14, a gear 57 is secured to the inner end of the shaft 54. The gear 57 is meshed with and driven by a gear 58 which is fixed on the vertical shaft 59. The shaft 59 has the lower end journaled in the bearing 60 which is supported in the block 61. The block 61 is secured by the screws 62 to the retainer ring 63 that is carried on the lower end of a motor support shaft 64. The shaft 64 is tubular and extends upwardly into the pivot housing 10 and has fixed on its upper end the angular displacement drive motor 65. The drive motor 65 may be any suitable electric or hydraulic drive motor.

As shown in FIG. 15, the drive motor 65 is fixed to the flange 66 which is in turn fixed to the tubular support shaft 67 that is secured to the horizontal plate 68 of the upper slide 20. An annular bearing 69 is disposed between the upper end of the shaft 67 and the pivot housing horizontal wall 70. The motor 65 is provided with an output shaft 71 which is operatively connected by the coupling 72 to the upper end 73 of the shaft 59. The shaft 59 is journaled in the bearings 74 which are held in the lower end of the tubular shaft 64.

Figure 17:
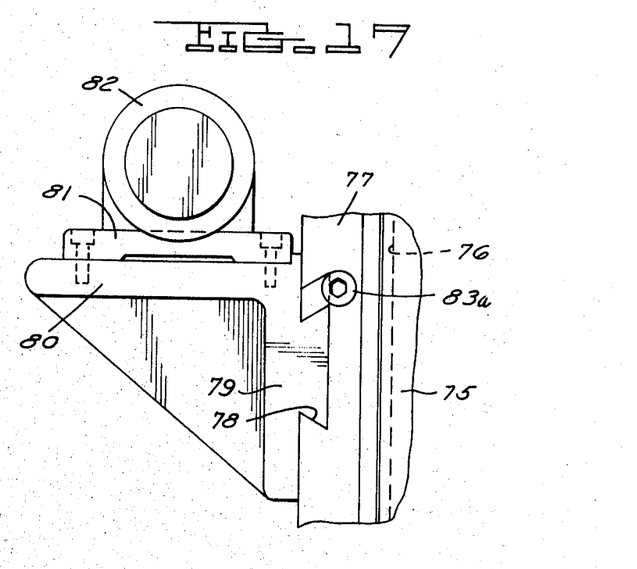

As best seen in FIG. 14, the lower slide 49 carries a vertical, downwardly extended flange 75 along the rear side thereof on which is formed the vertically disposed, horizontally extended slideway 76 for the slidable reception of the slide 77. It will be seen, that when the lower slide 49 is in a centered position, the slide 77 is movable in a horizontal direction and on a vertical plane. As shown in FIG. 17, the slide 77 is provided on its front face with a vertically extended slideway 78 for the slidable reception of the vertical slide 79. It will be seen that the slides 77 and 79 are movable at right angles to each other so as to provide a compound slide means. An adjustment screw 83a is provided for adjusting the slide 79 in the slideway 78. A similar screw is also provided for adjusting the position of the slide 77 in the slideway 76.

As shown in FIG. 17, the slide 79 carries a flange 80 on which is fixed a spindle mounting plate 81 that carries the cutting tool spindle 82. The tool spindle 82 may be any suitable tool spindle. As shown in FIG. 13, the tool spindle 82 is shown as carrying a pointed cutting tool 83. The drive shaft 84 of the tool spindle 82 carries a drive pulley 85 which is driven by the belt 86 from the pulley 87 that is mounted on the output shaft of the drive motor 88. The drive motor 88 is fixed on the vertical slide 79 and may be any suitable electric or hydraulic drive motor. As shown in FIG. 13, when the slides 77 and 79 are in their initial or zero positions, the centerline of the tool spindle 82 is aligned with the axis 25 of the angular displacement drive motor 65 and the axis about which the upper slide 20 rotates.

Figure 12:
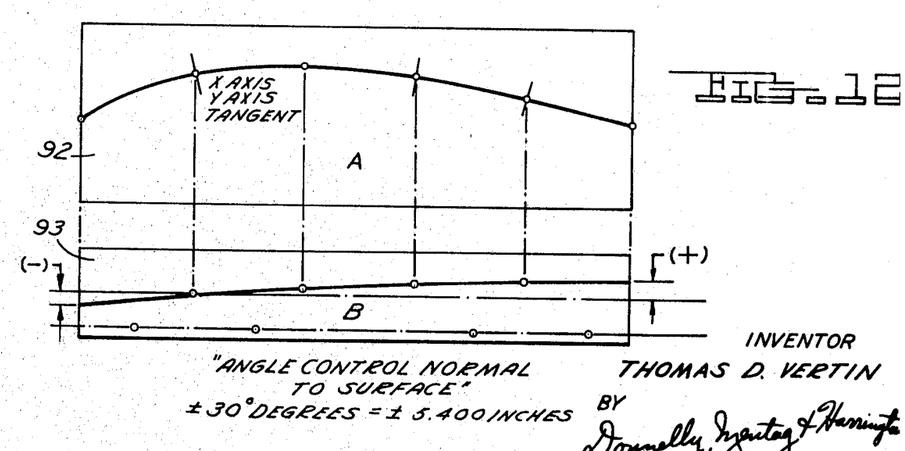
FIG. 12 shows a contour-tangent displacement drawing and an angular displacement drawing for use in controlling the operation of the machining head of the present invention.

It will be understood that the various aforementioned drive motors may be controlled by any suitable automatic control system in coordination with the drive means for the three-axis means on the machine since automatic control systems of this type are within the realm of selection by a skilled mechanic. For example, an electrical-mechanical tracer controlled system may be used with templates formed in accordance with the drawings of FIG. 12. Also, a suitable optical scanner control system may be used with the drawings shown in FIG. 12. A five-axis numerical control programmed system may also be used.

Figure 1:
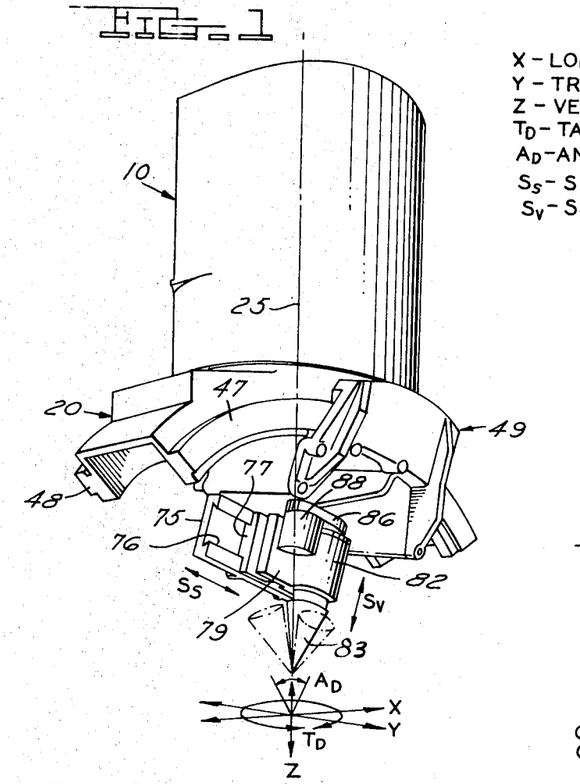
FIG. 1 is a perspective view of a machining head made in accordance with the principles of the present invention.
Figure 2:
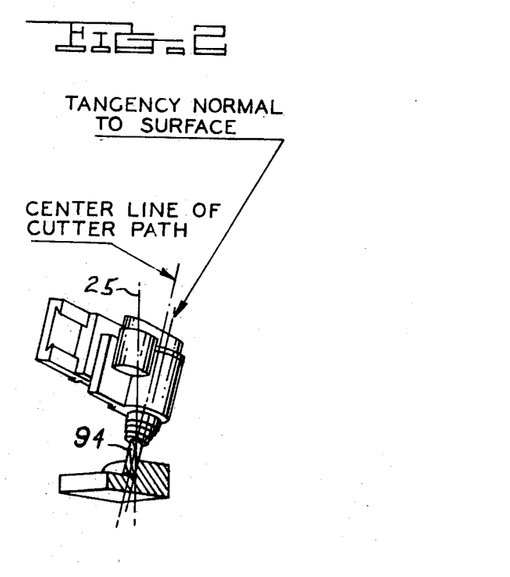
FIG. 2 is a partial perspective view of the machining head shown in FIG. 1, and showing the spindle provided with a cylindrical cutter operating on a workpiece.
Figure 3:
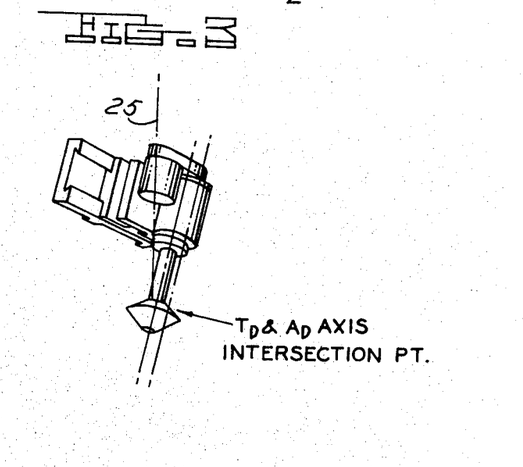
FIG. 3 is a partial perspective view of the machining head shown in FIG. 1, an and showing a form cutter mounted on the machining head spindle.
Figure 4:
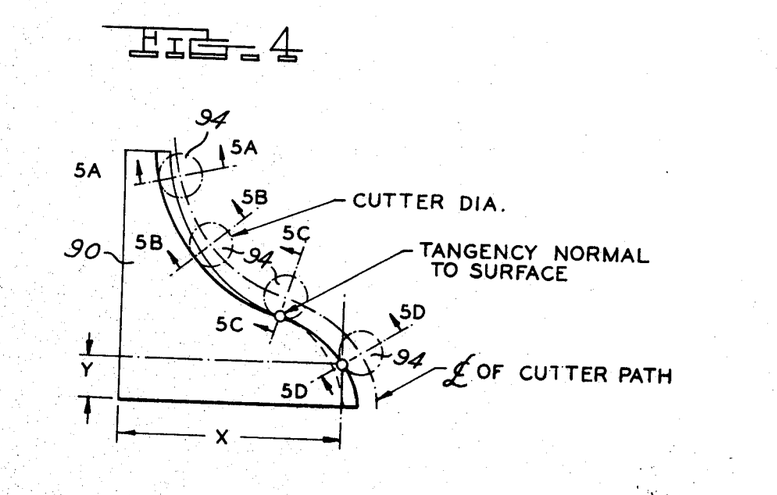
FIG. 4 illustrates the use of the machining head of the present invention in the cutting of a three-dimensional variant surface on a workpiece forming block when the machining head is provided with a cylindrical cutter.
Figure 5:
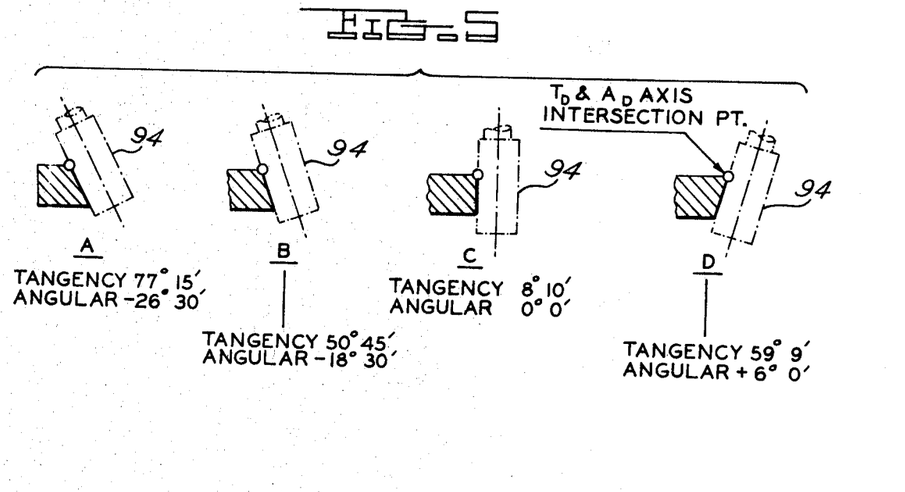
FIG. 5 illustrates four different positions which the cylindrical cutter assumes at the four correspondingly marked positions of FIG. 4.
Figure 6:
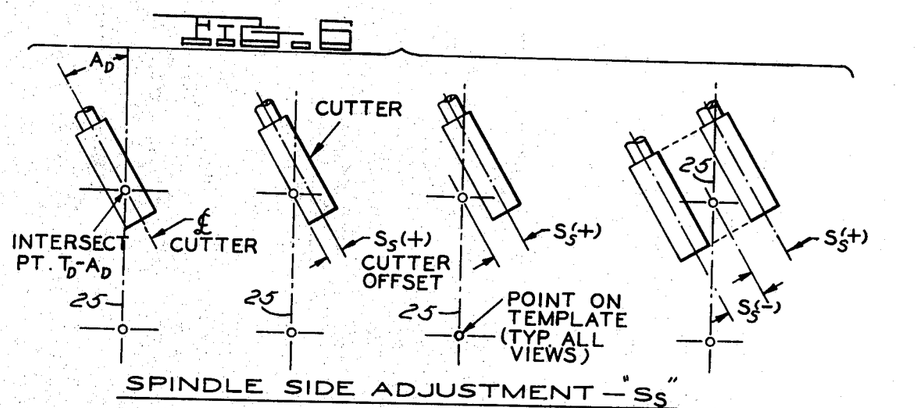
FIG 6 illustrates a number of positions to which the spindle may be moved by means of the spindle side adjustment means.
Figure 7:
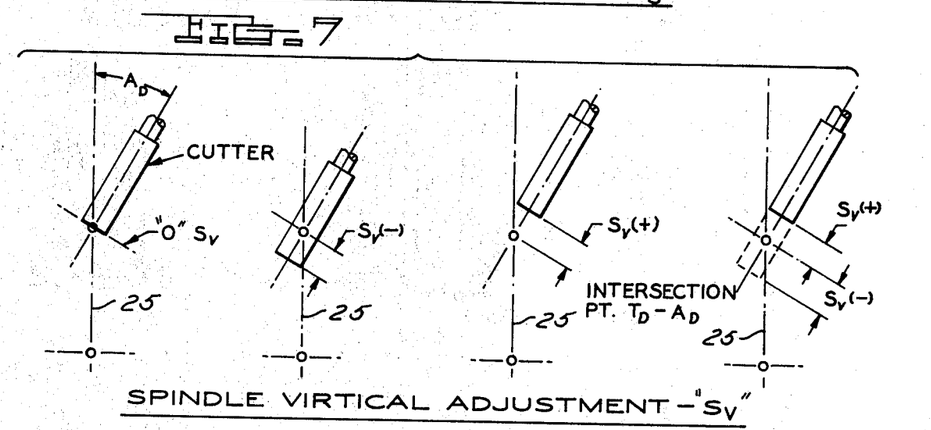
FIG. 7 illustrates a number of positions to which the spindle may be moved by means of the spindle vertical adjustment means.
Figure 8:
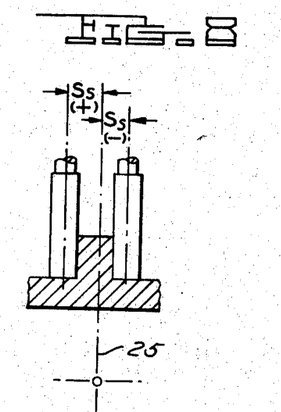
FIGS. 8, 9 and 10 illustrate various positions assumed by a cylindrical cutter carried by the spindle when the spindle is in the vertical position and the spindle is adjusted by means of the side and vertical adjustments.
Figures 9, 10:
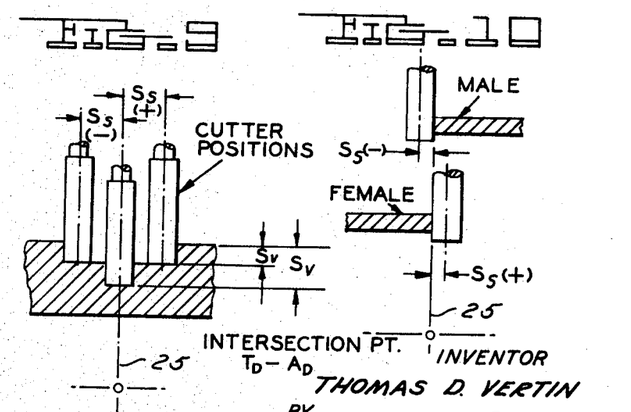

In use, a workpiece, as 90 of FIG. 4, would be mounted on the work table 91 (FIG. 11) of the machine, and the proper templates or drawings would be disposed in an operative position relative to the control system optical scanning device or tracer device. The contour-tangent displacement template 92 is located in relation to the angular displacement template 93 as in FIG. 12, so that the angle of the cutter will be in correct position for starting the contour. In the illustrative example, a cylindrical cutting tool or cutter 94 (FIG. 2) is employed. The workpiece 90 is coordinated to the contour template on the machine. The foregoing describes the setup on the machine.

The cutter 94 is next setup. The cutter diameter is first determined and the spindle side adjustment ($S_s$) slide 77 is moved toward the scrap side of the metal a distance of one-half the cutter diameter. This movement puts the axis intersection point on the side of the cutter. Next, the height of the contour line above the worktable 91 is determined relative to the side view of the material to be cut. The next step is the setting of the height of the tangent displacement ($T_D$) and ($A_D$) axis intersection point to match the height of the contour line on the Z axis of the machine. Next, the spindle vertical adjustment slide 79 ($S_v$) is adjusted to insure that the cutter will machine all the surface.

The next step in a typical operation is the machining of the contour. Machining is started on the runoff section of the templates and then the cutter is fed into the workpiece. All axes are fully automatic and work in complete coordination with each other at all times. The contour template controls the X and Y movements of the machine and automatically feeds a signal to the tangent displacement drive motor 43 which functions so as to keep the cutter 94 normal to the surface at all times. The angle control template is made in such a way as to cause the angle displacement of the cutter to be normal to the surface. When a positive signal is sent to the angle displacement drive motor 65 it moves in one direction and when it receives a negative signal it moves in the opposite direction. A null signal holds the head in its proper position. The angle displacement range of one embodiment of the invention was ±30°

FIGS. 6 through 10 illustrate the novel functioning of the machining head. It will be seen that the tangent displacement means provides 360° rotation ($T_D$) for the entire head structure, other than the pivot housing 10. During rotation of the machining head, the intersection point of the angular and tangent displacement axes never changes. Tangency normal to the surface being machined is maintained at all times. Angle programming is simplified because the cutter remains normal to the surface.

The angular displacement ($A_D$) permits machining of variable angles along a contour. Because the intersection point of the angular and tangent displacement axes never changes, the need for angular cutters is eliminated.

The spindle side adjustment ($S_S$) permits the axis intersection point to be on the cutter centerline, or on either side thereof (plus or minus). It permits the machining of male and female contours from one template. A parallel section can be machined from one template by machining with the spindle offset in one direction (plus) and then offsetting the spindle in the other direction (minus). Cutter wear is adjusted for in the spindle.

The spindle vertical adjustment ($S_v$) permits the axis intersection point to be positioned anywhere along the cutter axis. It can be used for making the inside of metal contours and the outside of metal contours from one template. The spindle vertical adjustment ($S_v$) does not affect the relative position of the cutter to the axis intersection point.

While it will be apparent that the preferred embodiment of the invention herein disclosed is well calculated to fulfill the objects above stated, it will be appreciated that the invention is susceptible to modification, variation and change.

I claim:

1. In a machine tool having a work support (91) and three machine members (10, 13, 15) slidably interconnected for controlled longitudinal, transverse and vertical movements relative to each other and to said work support to provide three-axis movement to one of said machine members, a two-axis machining head to provide a cutting tool with a five-axis movement comprising:
  a. a first slide member (20);
  b. means (21, 22, 23, 24, 26—43) rotatably mounting said first slide member (20) on one (10) of said three machine members for rotation about a vertical axis (25);
  c. a second slide member (49);
  d. a cutting tool spindle (32) carried by said second slide member (49) and having said cutting tool (83) operatively mounted therein;
  e. means (47, 48, 50, 51) slidably mounting said second slide member (49) on said first slide member (20) for downwardly facing concave arcuate movement along said first slide to provide said cutting tool (83) with an angular displacement of its axis relative to said vertical axis, with the front end of the cutting tool (83) disposed downwardly toward said vertical axis (25), and to provide said cutting tool with tangent displacement when said first slide member is rotated about said vertical axis;
  f. a compound slide means (77, 79) carried by said second slide member (49);
  g. said cutting tool spindle (82) being carried by said compound slide means; and,
  h. means (83a) for adjusting said compound slide means to provide said cutting tool spindle (82) and cutting tool (83) with an axial adjustable movement, and a transverse side adjustable movement relative to the axis (25) of the cutting tool spindle and cutting tool.

2. The machining head defined in claim 1, including:
  a. power drive means carried on said compound slide means and operatively connected to said cutting tool spindle for selective rotation of the spindle and the cutting tool in the spindle.

3. The machining head defined in claim 2, wherein said compound slide means comprises:
  a. a first slide disposed longitudinally of the axis of said cutting tool spindle, and said cutting tool spindle being mounted on said first slide;
  b. a first slideway disposed longitudinally of the axis of said cutting tool and having said first slide slidably mounted therein;
  c. means for adjusting said first slide in said first slideway;
  d. said first slideway being carried on a second slide which is disposed at a right angle to the axis of the cutting tool spindle;
  e. a second slideway disposed at a right angle to the axis of the cutting tool spindle, and having said second slide slidably mounted therein;
  f. means for adjusting said second slide in said second slideway; and,
  g. said second slideway being carried on said second slide member.

4. In a machine tool having a work support (91) and three machine members (10, 13, 15) slidably interconnected for controlled longitudinal, transverse and vertical movements relative to each other and to said work support to provide three-axis movement to one of said machine members, a two-axis machining head to provide a cutting tool with a five-axis movement comprising:
  a. a first slide member (20);
  b. means (21, 22, 23, 24, 26—43) rotatably mounting said first slide member (2) on one (10) of said three machine members for rotation about a vertical axis (25);
  c. a second slide member (49);
  d. a cutting tool spindle (82) carried by said second slide member (49) and having said cutting tool (83) operatively mounted therein;
  e. means (47, 48, 50, 51) slidably mounting said second slide member (49) on said first slide member (20) for downwardly facing concave arcuate movement along said first slide to provide said cutting tool (83) with an angular displacement of its axis relative to said vertical axis, with the front end of the cutting tool (83) disposed downwardly toward said vertical axis (25), and to provide said cutting tool with tangent displacement when said first slide member is rotated about said vertical axis;
  f. a compound slide means (77, 79) carried by said second slide member (49);
  g. said cutting tool spindle (82) being carried by said compound slide means (77, 79);
  h. means (83a) for adjusting said compound slide means to provide said cutting tool spindle (82) and cutting tool (83) with an adjustable movement, and a transverse side adjustable movement relative to the axis (25) of the cutting tool spindle and cutting tool;
  i. said means for rotatably mounting said first slide member (20) on said one of said three machine members comprising:
    1. means (21, 22) for rotatably journaling said first slide member on said one machine member; and
    2. power drive means (43) operatively connected (23, 26, 27, 41, 42) to said first slide member (20) for selective rotation of said first slide member about said vertical axis (25) to adjust the tangent displacement of said cutting tool (83);
  j. power drive means (65) operatively connected to said second slide member (49) for selective arcuate movement of said second slide member for adjusting the angular displacement of the axis of said tool (83) relative to said vertical axis (25); and,
  k. power drive means (84—88) carried on said compound slide means and operatively connected to said cutting tool spindle (82) for selective rotation of the spindle and the cutting tool in the spindle.

5. The machining head defined in claim 4, wherein said power drive means is carried on said first slide.